(12) United States Patent
Townend

(10) Patent No.: US 10,432,061 B2
(45) Date of Patent: Oct. 1, 2019

(54) FLYWHEEL ASSEMBLY

(71) Applicant: GKN HYBRID POWER LIMITED, Worcestershire (GB)

(72) Inventor: Rick Townend, Worcestershire (GB)

(73) Assignee: GKN HYBRID POWER LIMITED, Worcestershire (GB)

( * ) Notice: Subject to any disclaimer, the term of this patent is extended or adjusted under 35 U.S.C. 154(b) by 135 days.

(21) Appl. No.: 15/113,741

(22) PCT Filed: Jan. 22, 2015

(86) PCT No.: PCT/GB2015/050144
§ 371 (c)(1),
(2) Date: Jul. 22, 2016

(87) PCT Pub. No.: WO2015/110816
PCT Pub. Date: Jul. 30, 2015

(65) Prior Publication Data
US 2017/0012489 A1    Jan. 12, 2017

(30) Foreign Application Priority Data

Jan. 22, 2014 (GB) .................................. 1401074.8

(51) Int. Cl.
| | |
|---|---|
| *H02K 7/02* | (2006.01) |
| *H02K 1/02* | (2006.01) |
| *H02K 15/03* | (2006.01) |
| *H02K 1/27* | (2006.01) |
| *F16F 15/315* | (2006.01) |

(52) U.S. Cl.
CPC ........... *H02K 7/025* (2013.01); *F16F 15/315* (2013.01); *H02K 1/02* (2013.01); *H02K 1/2786* (2013.01); *H02K 15/03* (2013.01); *H02K 2213/03* (2013.01); *Y02E 60/16* (2013.01)

(58) Field of Classification Search
USPC .......................................................... 310/74
See application file for complete search history.

(56) References Cited

U.S. PATENT DOCUMENTS

| | | | |
|---|---|---|---|
| 5,122,704 A * | 6/1992 | Blakeley | H02K 3/24 310/192 |
| 5,285,699 A | 2/1994 | Walls et al. | |

(Continued)

FOREIGN PATENT DOCUMENTS

| | | |
|---|---|---|
| CN | 102428294 | 4/2012 |
| EP | 1077335 | 2/2000 |

(Continued)

OTHER PUBLICATIONS

PCT Search Report for corresponding PCT Application No. PCT/GB2015/050144 dated Aug. 27, 2015, 5 pages.

(Continued)

*Primary Examiner* — Thomas Truong
(74) *Attorney, Agent, or Firm* — Lee & Hayes, P.C.

(57) ABSTRACT

An annular rotor for a flywheel, the rotor comprising a tow comprising a matrix of fibres wound about an axis and arranged in layers comprising a gap between adjacent tow windings, wherein the winding angle between a normal to the axis and the tow is less than 3.5° and the matrix further comprises magnetic particles of a size less than the critical flaw size of the tow.

20 Claims, 8 Drawing Sheets

(56) References Cited

U.S. PATENT DOCUMENTS

| | | | | |
|---|---|---|---|---|
| 5,717,263 A | * | 2/1998 | Cox | F16F 15/305 |
| | | | | 252/62.54 |
| 5,760,508 A | | 6/1998 | Jennings et al. | |
| 6,943,476 B2 | * | 9/2005 | Regazzi | H02K 1/2786 |
| | | | | 310/152 |
| 2008/0213498 A1 | * | 9/2008 | Drzal | B29C 70/025 |
| | | | | 427/475 |

FOREIGN PATENT DOCUMENTS

| | | |
|---|---|---|
| EP | 1199493 | 4/2002 |
| EP | 1994693 | 11/2008 |
| GB | 2491975 | 12/2012 |
| GB | 2504216 | 1/2015 |
| GB | 2504217 | 9/2016 |
| JP | 2004320001 | 11/2004 |
| JP | 2006073880 | 3/2006 |
| JP | 2007010585 | 1/2007 |
| JP | 2009502596 | 1/2009 |
| JP | 2009071910 | 4/2009 |
| JP | 2011089142 | 5/2011 |
| WO | WO 94/06193 | 3/1994 |
| WO | WO9502269 | 1/1995 |
| WO | WO2012151433 | 11/2012 |

OTHER PUBLICATIONS

GB Search Report for corresponding GB Patent Application No. GB140174.8 dated Aug. 1, 2014, 9 pages.

Chinese Office Action from corresponding Chinese Patent Application No. 2015800157405 dated Jun. 4, 2018, 2 pages.

Japanese Office Action from corresponding Japanese Patent Application No. 2016-548294 dated Jan. 8, 2019, 11 pages.

* cited by examiner

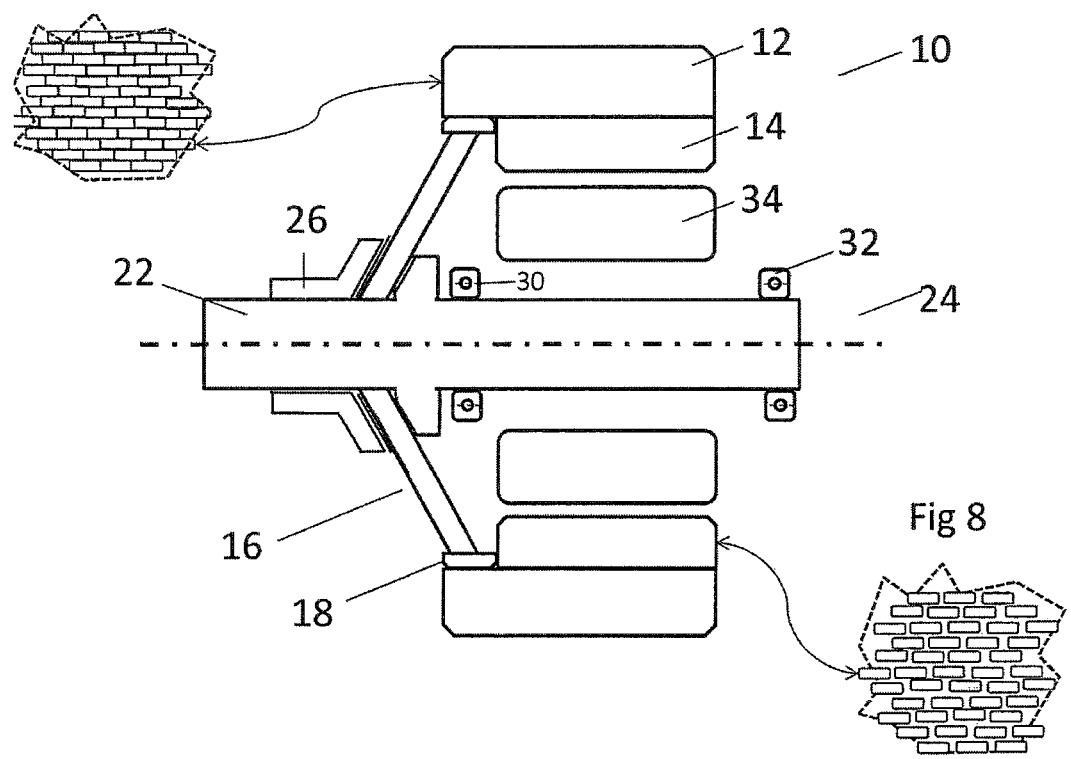

10 µm    60 to 70 µm            150 µm      200 µm

FLYWHEEL ASSEMBLY

The present disclosure relates to a flywheel assembly. In particular, it relates to an improved method and system for determining magnetic properties of a rotating part of a flywheel assembly.

BACKGROUND

Flywheels are well known devices, used for storing energy in a rotating mass. The amount of energy stored in a flywheel is proportional to the square of its rotational speed. In general, energy is transferred to a flywheel for storage by the application of a torque to the flywheel, causing its rotational speed to increase. Conversely, energy can be released or recovered from a flywheel by the flywheel applying a torque to a load, as a result of which the flywheel's rotational speed decreases.

Many known flywheel kinetic energy storage assemblies include an electrical machine which can function either as a motor or a generator. When the electrical machine acts as a motor (i.e. when the flywheel assembly is in "motoring" or "recuperating" mode), electrical energy supplied to the machine is converted to kinetic energy and, as a result, the flywheel mass rotates more quickly. When the electrical machine acts as a generator (i.e. when the flywheel assembly is in "generating" or "boosting" mode), kinetic energy stored in the flywheel mass is converted to electrical energy and can be supplied onwards to another component with a system such as an electric motor and as a result the flywheel rotates more slowly.

In practice, the maximum speed at which a flywheel mass can safely rotate, and hence the amount of energy which the corresponding flywheel assembly can store, will depend at least in part on the mechanical strength and strain capabilities of the flywheel assembly. For example, an important factor is its behaviour in response to the mechanical stresses which are experienced at high rotational speeds.

When a flywheel assembly comprises an electrical machine, another factor in how fast the flywheel mass can rotate is the manner in which the electrical machine can be controlled. It is desirable to implement a reliable and efficient control scheme, which works at a range of flywheel rotational speeds. It is also desirable to avoid and/or reduce losses, for example losses due to heat dissipation, as much as possible. And it is important that the flywheel assembly is as safe as possible, including being safe in the event that the flywheel assembly experiences a failure or breakage.

According to known methods, the manner in which the rotating parts of a flywheel assembly are to be controlled can have a significant influence on the manner in which the physical components of the flywheel assembly are constructed. For example, the magnetic rotating part(s) of the electrical machine can be shaped in a particular manner in order to determine their magnetic properties, in preparation for application of electrical pulses to the flywheel assembly in a particular pattern such as a sine wave.

GB 1312924.2 filed 19 Jul. 2013 and GB1312927.5 filed 19 Jul. 2013 are hereby incorporated by reference in their entirety.

An invention is set out in the claims.

According to an aspect there is provided an annular rotor for a flywheel as defined in claim 1. Thus there is provided an annular rotor for a flywheel, the rotor comprising a tow comprising a matrix of fibres wound about an axis and arranged in layers comprising a gap between adjacent tow windings, wherein the winding angle between a normal to the axis and the tow is less than 3.5° and the matrix further comprises magnetic particles of a size less than the critical flaw size of the tow.

Optionally, the winding angle is less than 1.5°.
Optionally, the winding angle is less than 0.6°.
Optionally, the winding angle is greater than 0.3°.
Optionally, the magnetic particles are non-spherical in shape.
Optionally, the magnetic particles are substantially linear in shape.
Optionally, the magnetic particles are less than 500 μm in length.
Optionally, the magnetic particles are more than 10 μm in length.
Optionally, the density of the magnetic particles reduces with increasing distance from the axis.
Optionally, the magnetic particles comprise quench milled NdFeB.
Optionally, the tow comprises unidirectional fibres.
Optionally, the annular rotor wherein magnetic particles of longest dimension less than 70 μm are positioned in the gap between coincident tows.
Optionally, the rotor is magnetised.
Optionally, the annular rotor comprises north-south pole pairs.
Optionally, the north-south pole pairs are alternating north-south pole pairs, each pole of a pair occupying an arc around the annular rotor.
Optionally, the annular rotor comprises 12 north-south pole pairs.
Optionally, the pole pairs are arranged to direct a majority of magnetic flux towards the axis of the annular rotor.
Optionally, the annular rotor is an inner portion; and further comprising an outer portion comprising a matrix of fibres wound about the same axis, the outer portion having a diameter larger than the inner portion and wherein the winding angle between a normal to the axis and the tow of the outer portion is 1° or less.
Optionally, an area of the outer portion in alignment with each north pole of the inner portion is painted black or white and an area of the outer portion in alignment with each south pole of the inner portion is painted the other of black or white respectively.
Optionally, the rotor is housed within a vacuum.
Optionally, the rotor is the rotor of a flywheel.

According to a second aspect there is provided a method of providing an annular rotor for a flywheel as defined in claim 11. Thus there is provided a method of providing an annular rotor for a flywheel comprising winding a tow comprising a matrix of fibres about an axis, the tow being arranged in layers comprising a gap between adjacent tow windings, wherein the winding angle between a normal to the axis and the tow is less than 3.5° and providing magnetic particles within the matrix of a size less than the critical flaw size of the tow.

Optionally, the method wherein the winding angle is less than 1.5°.
Optionally, the method wherein the winding angle is less than 0.6°.
Optionally, the method wherein the winding angle is greater than 0.3°.
Optionally, the method wherein the magnetic particles are non-spherical in shape.
Optionally, the method wherein the magnetic particles are substantially linear in shape.
Optionally, the method wherein the magnetic particles are less than 500 μm in length.

Optionally, the method wherein the magnetic particles are more than 10 µm in length.

Optionally, the method wherein the density of the magnetic particles reduces with increasing distance from the axis.

Optionally, the method wherein the magnetic particles comprise quench milled NdFeB.

Optionally, the method wherein the tow comprises unidirectional fibres.

Optionally, the method wherein the magnetic particles are urged to lay flat in the direction of the winding on the surface of the individual tow layers.

Optionally, the method wherein particles of size less than 70 µm are urged to collect in the gap between coincident tows when winding the annular rotor.

Optionally, the method wherein after winding the tow, the step of imparting flux onto the annular rotor is performed so as to magnetise the annular rotor.

Optionally, the method wherein rotor comprises north-south pole pairs

Optionally, the method wherein the magnetised rotor comprises alternating north-south pole pairs, each pole of a pair occupying an arc around the annular rotor.

Optionally, the method wherein the rotor comprises 12 north-south pole pairs.

Optionally, the method wherein the pole pairs are arranged to direct a majority of magnetic flux towards the axis of the annular rotor.

Optionally, the method wherein annular rotor is an inner portion and further comprising winding an outer portion comprising a matrix of fibres wound about the same axis, the outer portion having a diameter larger than the inner portion and wherein the winding angle between a normal to the axis and the tow of the outer portion is 1° or less.

Optionally, the method further comprising painting an area of the outer portion in alignment with each north pole of the inner portion black or white and painting an area of the outer portion in alignment with each south pole of the inner portion the other of black or white respectively.

FIGURES

Embodiments will now be described by way of example with respect to the accompanying figures of which:

FIG. 4b is a plan view of three (teeth) bars of the type shown in FIG. 4a;

FIG. 8 shows an enlarged partial cross-sectional view of layers of tow winding forming an inner annulus of a flywheel assembly;

FIG. 9 shows an enlarged partial cross-sectional view of layers of tow winding forming an outer rotor of a flywheel assembly;

In the figures, like elements are indicated by like reference numerals throughout.

OVERVIEW

In overview, a flywheel assembly is disclosed comprising an outer portion and an inner portion. The flywheel exhibits desirable properties of strength and controlled failure in the event of fatigue as well as the ability to tailor the magnetic field of the permanently magnetised inner portion. Advantageously, the magnetised inner portion comprises magnetic particles arranged to prevent the build-up of heat due to eddy currents when rotating. This allows rotation within a vacuum for efficiency as heat dissipation is not so critical, and also allows a more simple control scheme for storing and recovering energy in the flywheel system.

DETAILED DESCRIPTION

Figure 1:
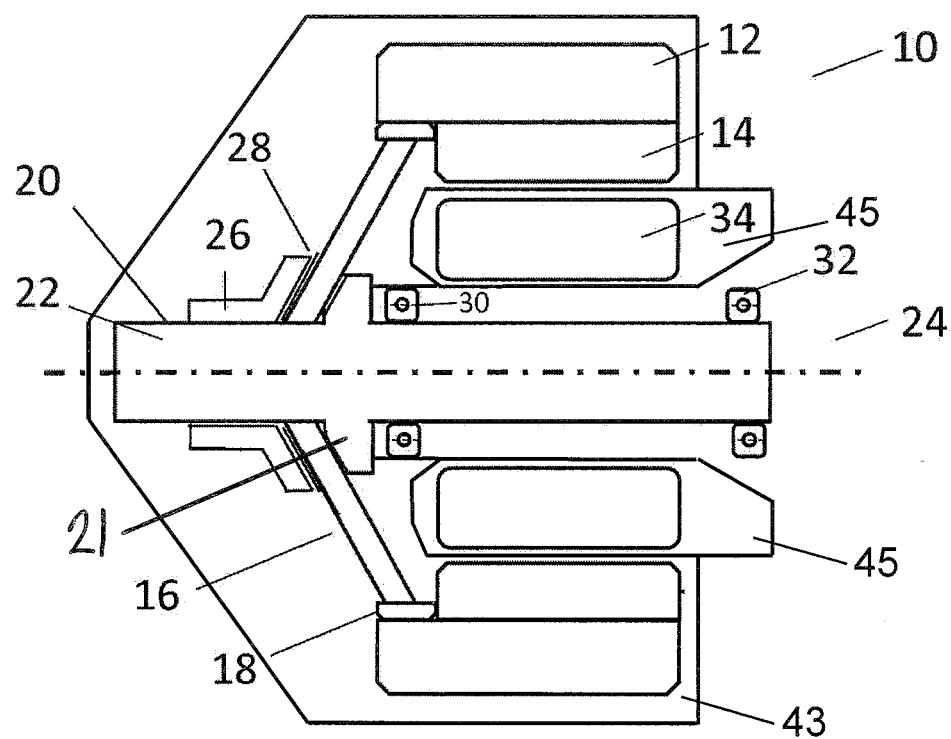
FIG. 1 is a cross-sectional side view of a flywheel assembly.

FIG. 1 shows a flywheel assembly 10. This assembly is shown and described in co-pending GB patent application number GB1312927.5, the entirety of which is incorporated by reference herein, and therefore the flywheel assembly 10 is described relatively briefly below.

The flywheel assembly 10 includes a rotor assembly 12, 14 having an annular outer rotor 12 and an inner annular rotor or "inner annulus" 14. According to an embodiment, the outer rotor 12 is formed of a composite material comprising unidirectional filaments of carbon fibres in a matrix of a resin material. The outer rotor 12 and inner annulus 14 act as the rotating flywheel mass, for energy storage, as will be appreciated by the skilled reader. The inner annulus 14 is formed using, inter alia, magnetic particles and can be permanently magnetised, as described in detail below. According to an embodiment, the inner annulus 14 is formed of unidirectional filaments of glass fibre in a matrix formed of a mixture of resin and magnetic particles.

The rotor assembly 12, 14 is carried by a rotor support in the form of a hub or end cap 16. A ring 18, which may comprise glass, is provided between the end cap 16 and the rotor assembly 12, 14. The ring 18 may be arranged to stop the outer edge of the end cap 16 digging into the outer rotor 12. The end cap 16 in the embodiment of FIG. 1 is generally conical in shape. Its outer circumference carries the ring 18 which is in turn attached to the outer rotor 12, on its inner cylindrical surface. The end cap 16 has a central circular opening 20, through which a shaft 22 can be inserted. In operation, the rotating parts of the flywheel assembly 10 rotate about the central longitudinal axis 24 defined by the shaft 22.

According to an embodiment, some or all of: the ring 18, end cap 16 and outer rotor 12 are strain matched. As a result, these components of the flywheel assembly 10 will exhibit substantially uniform deformation when under high rotational load, thereby reducing the risk of unexpected flywheel failure during rotation.

Chamfers are defined at each end of the inner cylindrical surface of the inner annulus 14. The chamfers preferably define angles with respect to the longitudinal axis 24 of at least 20 degrees, more preferably 20-60 degrees, and more preferably still 50-55 degrees, to avoid cracking of the edge at high rotational speeds.

The components of the flywheel assembly 10 can be mechanically connected in any suitable manner. In the particular embodiment shown in FIG. 1, the shaft 22 includes a circumferentially extending flange 21. The end cap 16 is retained against the flange 21 by a clamping nut 26 which is threaded onto the shaft 22. An anti-fretting shim 28 is provided between the clamping nut 26 and the end cap 16. The shaft 22 is supported for rotation about the longitudinal axis 24 of the flywheel assembly 10 by a pair of bearings 30, 32. The bearings 30, 32 are in turn supported by a containment (not shown) for the flywheel assembly. The rotor assembly 12, 14 is rotatable about a stator 34 carried by the containment.

The containment comprises a cavity comprising a vacuum 43. Rotor assembly 12, 14 is contained within the cavity and therefore rotates within vacuum 43. Stator 34 is contained within an additional cavity 45 which may be flooded with oil or other substance capable of providing cooling properties. Cavity 45 within which Stator 34 is contained does not comprise a vacuum as with a vacuum the stator could suffer from Paschen discharge due to the high voltages involved in operation which may lead to degradation of associated insulation (not shown).

The stator 34 comprises one or more coils (not shown), to which pulses of electrical current can be applied when motoring. The application of electrical current to the stator coil(s) energises them and creates a magnetic flux or magnetic force in the stator pole pieces thereby repelling the magnetised pole pieces of the inner annulus 14, which has the effect of imparting torque on the rotor assembly 12, 14. This causes rotational energy to be stored in the rotor assembly 12, 14. Conversely, the moving, magnetised inner annulus 14 can be controlled in order to induce a current in the stator coil(s), thereby transferring energy from the rotor assembly 12, 14 to the stator 34. In summary, when motoring, energy may be transferred to the rotor by generating a rotating magnetic field in the stator coils to electromagnetically drive the permanent magnet inner annulus 14. When generating, the rotating magnetic flux of the inner annulus 14 induces a current on the coils of the stator which may be used to power other systems, for example an electric motor.

The flywheel assembly 10 can be constructed in any suitable manner. According to an embodiment, the outer rotor 12, the inner annulus 14, the end cap 16 and the ring 18 are press-fitted together. A lubricant such as a resin coating can be applied to some or all of the press-fitted components in order to enhance ease of assembly. An example of this is described in co-pending GB patent application number GB1312927.5, the entirety of which is incorporated by reference herein. According to an embodiment, the resin is subsequently cured to form a bond between the components.

The outer rotor 12 can be fabricated, at least in part, by winding a tow around a roller or mandrel, to build up layers of tow to form an annulus or disc-shape of wound layered composite. For example, the tow used to form the outer rotor 12 can comprise a carbon composite. An example of this is described in co-pending GB patent application number GB1312924.2, the entirety of which is incorporated by reference herein, and therefore the fabrication of the outer rotor 12 is not described further herein.

Figure 2A:
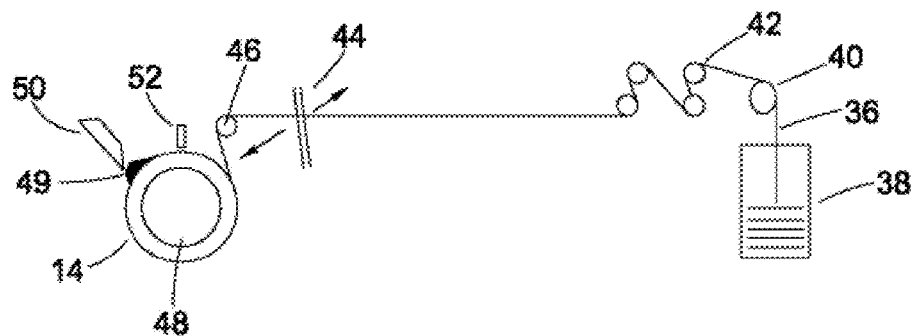
FIG. 2A is a side view of an arrangement for winding a magnetic glass fibre composite rotor.

FIG. 2A illustrates an arrangement for winding the MLC (magnetically loaded composite) of the inner annulus 14 of the flywheel assembly 10, according to an embodiment. A tow 36 formed of unidirectional filaments of glass fibre is drawn from a supply drum, wheel or box 38. The fibre may alternatively comprise carbon fibre, E-glass fibre, S-glass fibre, basalt rock fibre or boron nitride fibre. The tow 36 may or may not be pre-impregnated with resin. The tow 36 is drawn over a roller 40 which rotates about a fixed axis and then around a set of sprung or load-adjustable rollers 42 which both and guide and tension the tow of glass fibres.

The tow 36 passes between a pair of guide rollers 44 which are movable laterally relative to the tow 36 to adjust the position of the tow 36 over a further roller 46. The tow 36 is then drawn onto a rotating mandrel 48 to form the inner annulus 14. The tow 36 can be coated with any suitable substance before, during or after the rolling process. According to an embodiment shown in FIG. 2A, a mixture 49 of resin and magnetic particles is supplied via a pipe or duct 50 towards the surface of the rotating mandrel 48, ahead of the point where the tow 36 comes into contact with the outer surface of the mandrel 48. A doctor blade 52 ensures that an even thickness of resin and magnetic particles is distributed over the surface of the mandrel 48 so that the dry tow 36 becomes embedded in them and absorbs the excess resin to fully wet the tow 36. According to an embodiment, sufficient excess resin should be supplied onto the surface of the mandrel 48 such that the dry glass fibre tow 36 becomes fully wetted with resin without voids or bubbles forming in the composite material, now loaded with magnetic particles. The purpose, configuration and magnetisation of the magnetic particles within the inner annulus are discussed further below.

During construction of the inner annulus 14, the lateral movement of the guide rollers 44 can be synchronised with the rotation of the mandrel 48 to ensure that the tow 36 is wound evenly and precisely with the desired winding angle from one side of the mandrel 48 to the other in each successive layer, the layers being laid down one-by-one. During winding of the inner annulus 14 (and, separately, of the outer rotor 12) the winding angle can be reversed at the outer edge of each layer to start winding the subsequent layer.

Figure 2B:
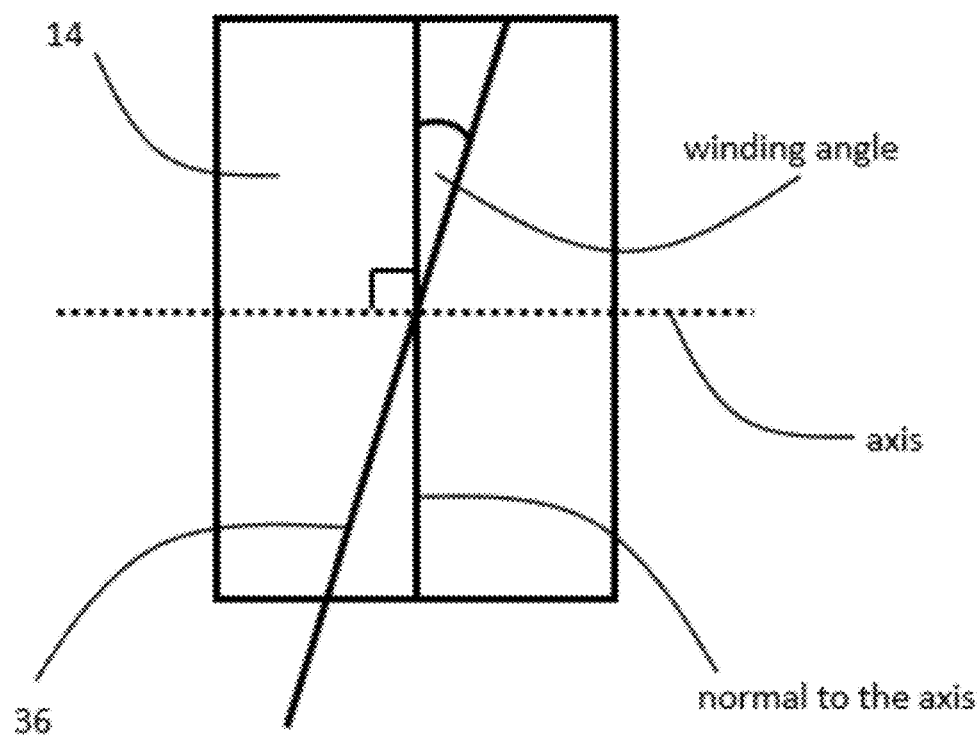
FIG. 2B is a plan view of an arrangement for winding a magnetic glass fibre composite rotor of the type shown in FIG. 2A.

FIG. 2B is a plan view of an example arrangement for winding a magnetic glass fibre composite rotor of the type shown in FIG. 2A. FIG. 2B illustrates the inner annulus 14 and a winding angle between a normal to the axis and the tow 36.

According to an embodiment, the mandrel 48 is rotated at a constant angular speed during winding of the tow 36, in order to form the layers of the inner annulus 14. As the skilled reader will appreciate, as the layers of the inner annulus 14 build up, the outer circumference of the inner annulus 14 will increase. Therefore the linear (or tangential) speed of the outer circumference of the inner annulus will increase over time. If the duct 50 supplies the mixture 49 of resin and magnetic particles at a substantially constant rate and with a substantially even distribution of magnetic particles within the mixture 49, the density of the magnetic particles within the inner annulus 14 decreases towards the outside of the inner annulus 14. It has been recognised herein that this decrease in magnetic particle density with increasing radius of the inner annulus 14 can have beneficial effects for the magnetic properties and operation of the flywheel assembly 10, as discussed further below.

Whilst a particular set-up of rollers and resin-addition components has been shown in FIG. 2A and described hereabove, it will be appreciated that other set ups may be used in order to form a wound inner annulus comprising magnetic particles that may be tailored to suit the application to which it will be applied. Moreover, the inner annulus 14 can be removed from the mandrel 48 after curing in any suitable manner.

The mixture 49 of resin and magnetic particles can be cured once the desired number of tow 36 layers have been wound to form the inner annulus 14. The curing can, for example, be carried out using an autoclave. However the curing can be carried out in any suitable manner as would be understood by the skilled person in order to achieve the required glass transition temperature associated with the resin in use, and so will not be described further herein.

It has been recognised herein that winding a tow of composite material in order to form components of the flywheel assembly such as the inner annulus 14 is beneficial for ensuring good mechanical strength of those components. Furthermore, it has been recognised herein that it is possible to determine some or all of the magnetic properties of the inner annulus 14 independently of determining and forming its physical structure. Therefore, according to the improved method and system described herein, the desired magnetic properties which the inner annulus 14 should exhibit during operation of the flywheel assembly 10 can be largely ignored—or at least do not have to be determinative— during the physical construction of the inner annulus 14. The manufacturer can instead focus on structural strength, or other desired physical properties, of the inner annulus 14 during the physical manufacture process. The magnetic properties of the inner annulus 14 can be determined thereafter, for example by choosing parts of the structure to magnetise and thereby shaping the inner annulus's magnetic field, as described in more detail below. According to an embodiment, this shaping of the magnetic field after the inner annulus 14 has been physically formed and cured does not compromise its structural strength.

Because the inner annulus 14 is formed from winding a tow—and therefore is built up to a desired size and shape rather than being formed from a larger formation that is cut to an appropriate size after manufacture, there is no need to cut the inner annulus 14. Nor is there any need for the inner annulus 14 to be cut in order to determine its magnetic properties (discussed further below). Typically, the strain to failure of the flywheel assembly 10 is around 1.3%, which compares favourably to non-MLC flywheel assemblies whereby a standard piece of magnetic material is wrapped in a composite material and wherein which the strain to failure was typically around 0.3%. This is because in known non-MLC electro-magnetic flywheel energy storage systems, the individual permanent magnets are bonded or fastened together to form the magnetic rotor. The structural joints of such magnets within the rotor causes eddy currents to be induced as the magnetic flux changes with rotation as would be understood. These eddy currents in turn cause heat build-up and other associated disadvantageous effects such as a reduction in the frequency of repetitive use as well as shorter lifetime through being subjected to a more strenuous heat profile when in operation (discussed further later). With the present MLC rotor, the magnetic particles of the annulus are so small that the individual tiny magnets are insulated from one another by the multi-layer composite and hence no eddy currents are formed. This has the benefit of negating the heating effect of non-MLC systems.

After it has been physically formed and set (which can include a curing step), the inner annulus 14 can be magnetised. According to an embodiment, the inner annulus 14 is not magnetised before it is properly set, in order to avoid clumping of magnetic particles and/or other possible alteration of its physical properties. The manner in which, according to an embodiment, the magnetic properties of the inner annulus 14 are controlled and determined will now be described in more detail.

Figure 3B:
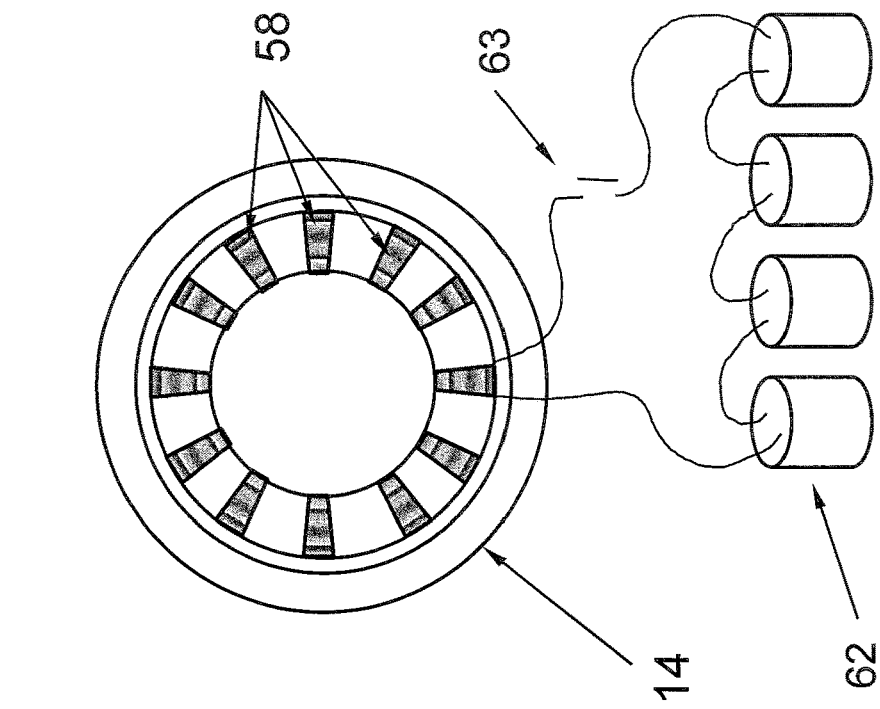
FIG. 3B is a plan view of a magnetising device with an inner annulus of a flywheel positioned thereon.
Figure 3A:
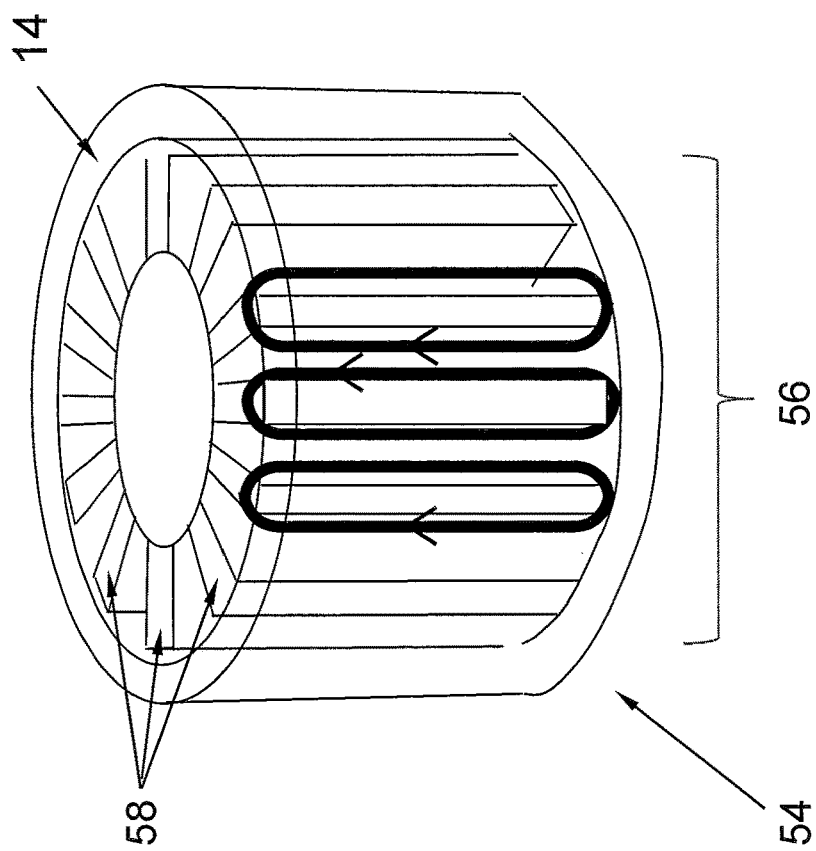
FIG. 3A is a perspective view of (part of) a magnetising device with an inner annulus of a flywheel assembly positioned thereon.

FIG. 3A shows a perspective view of a magnetising device 54 which can be used to impart specific magnetic properties on the inner annulus 14. The magnetising device 54 comprises a central axis 56 around which the constructed inner annulus 14 can be positioned, as discussed further below and as also shown in FIG. 3B in plan view. The magnetising device 54 further comprises a plurality of pole pieces (teeth) 58 preferably constructed of laminated soft iron or steel. The pole pieces 58 may be arranged in a substantially regular formation thereby defining the central axis 56. Each pole piece 58 is substantially rectangular in cross-section, with its longest axis extending substantially parallel to the longitudinal axis that runs through the central axis 56. The pieces 58 may be tapered to concentrate the flux, and the steel or iron acts as a conductor of the magnetic flux providing a low reluctance path which can shape or direct the magnetic flux. Magnetising device 54 may also be referred to as a magnetizer yoke. According to an embodiment, the pole pieces 58 are evenly spaced around the outside of the central axial opening 56, and the sides of each pole piece 58 are physically separated from the sides of its nearest neighbours. The number of pole pieces 58 comprised within the magnetising device 54 can vary, but there should be an even number of poles 58 in order for the magnetising device 54 to be used for imparting magnetic properties on the inner annulus 14 according to the improved method and system described herein.

Figure 4A:
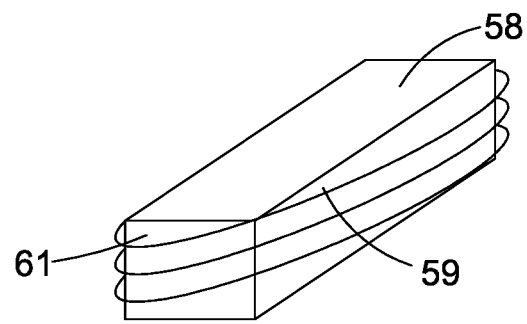
FIG. 4a is a perspective view of a metal bar (tooth) that forms part of the outer surface of the magnetising device of FIG. 3, wrapped in electrically conductive wire.
Figure 4B:
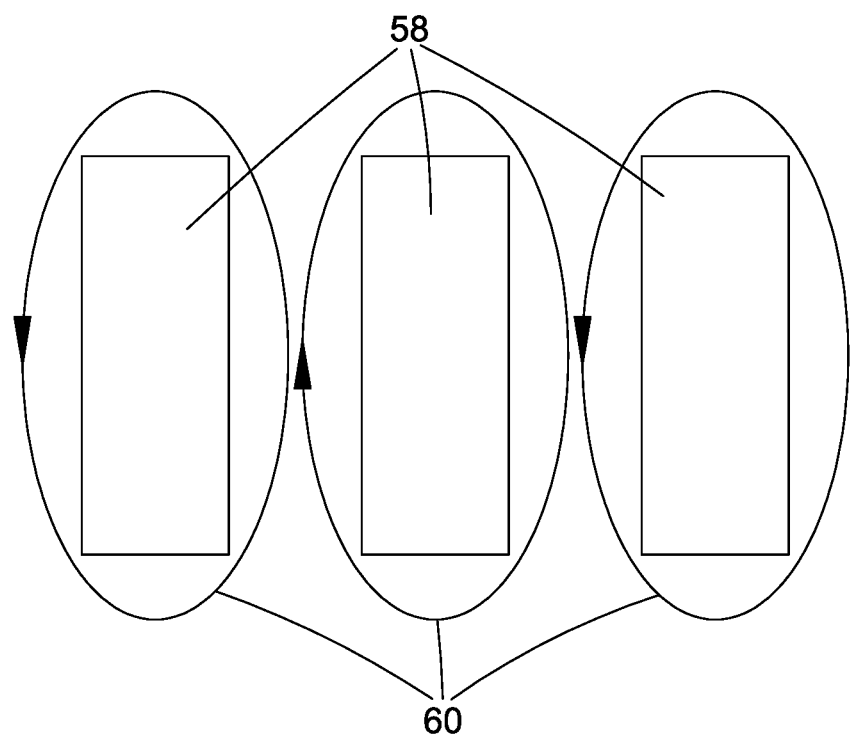

In order for the magnetising device 54 to impart flux on the inner annulus 14, the pole pieces 58 must be configured to act as alternating North (N) and South (S) poles. According to an embodiment, this is achieved by wrapping conductive winding material (preferably copper) into coils 60 around the outer surface of each pole piece 58. The coils 60 are formed around the sides 59 and end faces 61 of each pole piece 58, as illustrated in FIG. 4a herein. The conductive winding material may be of different cross-sectional area depending on the desired current flow. Preferably, the conductor comprises a flat ribbon profile which allows improved packing. According to an embodiment, eight coils 60 are formed around each pole piece 58, wherein the coils 60 around adjacent pole pieces 58 are wrapped in different respective directions (clockwise and counter-clockwise), in order for adjacent pole pieces to have opposite polarity once magnetised. This is illustrated in FIG. 4b herein.

The magnetic pole pieces 58 may be shaped in any manner, for example a fully annular pole piece (extending around the entire circumference of the inner annulus) can be used to form a magnetic bearing as would be understood. Further, sequentially circumferential pole pieces (each extending around the entire circumference of the inner annulus) may be used to form multi row bearings. Additionally, the poles may be tailored to form specific patterns of field strength.

Once the pole pieces 58 of the magnetising device 54 have been wrapped, the inner annulus 14 should be inserted into the central axial opening 56 of the magnetising device 54. A current can then be passed through the coils 60, for example by way of a capacitor bank 62 and switch 63. According to an embodiment, a very high current, of the order of 30 kA to 40 kA, is used. The effect of running this very high current through the coils 60 is, as mentioned above, to form N and S electromagnetic poles in the magnetising device 54, and the central axis 58, and thereby to impart magnetic flux on the inner annulus 14 that is positioned thereon. This has the effect of turning the inner annulus 14 into a number of permanent magnets, with alternating N and S poles 78 around its circumference.

Figure 5:
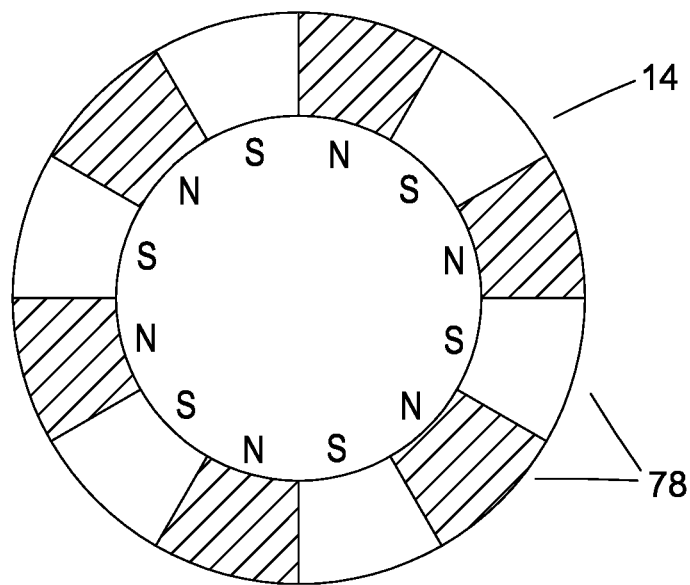
FIG. 5 is a cross-sectional side view of an inner annulus of a flywheel assembly, after magnetisation.

According to an embodiment, the magnetising device 54 can be used to form twelve magnetic poles 78—alternating N and S—in the inner annulus 14. This is illustrated in FIG. 5 herein. Physically, the poles 78 should be substantially equally sized. Therefore each pole 78 occupies an arc of approximately 30° around the inner annulus 14.

Other arrangements may also be formed, for example a 2, 4, 6, 8, 10 or 12-pole inner annulus (1, 2, 3, 4, 5, 6 pole pairs). A greater number could be used if desired.

For an increased number of pole pairs, greater transfer of energy to/from the flywheel when in use is achieved but with increased complexity of the system as a whole. The limiting factor is the diameter of the rotor as the magnetic rotor pieces (the inner annulus magnetized MLC) should be a minimum size in order to meet manufacturing constraints. The current of the electromagnets used to magnetise the inner annulus MLC must be sufficient to create the permanent magnet in the MLC. This is determined by the minimum (copper) conductor cross sectional area, which results in the windings of the electromagnets being constrained by the capacity of copper to conduct as would be understood.

Once it has been magnetised, the inner annulus 14 can be removed from the magnetising device 54, and can be incorporated into the flywheel assembly 10 along with the outer rotor 12 and other components. According to an embodiment, the inner annulus 14 and/or the outer rotor 12 can be painted in correspondence with the N-S poles. For example, the N and S poles 78 or areas of the outer rotor 12 in alignment with the poles can be painted or coloured black & white respectively. Optionally, they may be painted or coloured dark and light. This visual distinction between the N and S poles 78 can be used, for example, to enable optical sensors to detect and track rotation of the inner annulus 14, to monitor operation of the flywheel assembly. This is described in more detail in another GB patent application being filed today in the name of Williams Hybrid Power Limited and so will not be discussed further herein.

Although, as mentioned above, the process of magnetising the inner annulus 14 using the magnetising device 54 is carried out after the inner annulus has been physically formed and set, it is nonetheless possible to contribute to the magnetic properties of the inner annulus 14 during its physical construction. One manner in which this can be done is through controlling (or changing) the configuration of the magnetic particles within the layers of the inner annulus 14, which contributes to the magnetic flux profile and the shape of the magnetic fields that the inner annulus 14 will create once it has been magnetised by the magnetising device 54. The magnetic flux in the inner annulus 14 is very important as it controls (or limits) the extent to which a current can be induced in the inner annulus 14, as a result of which the rotor assembly 12, 14 rotates, storing rotational energy therein.

Figure 6:
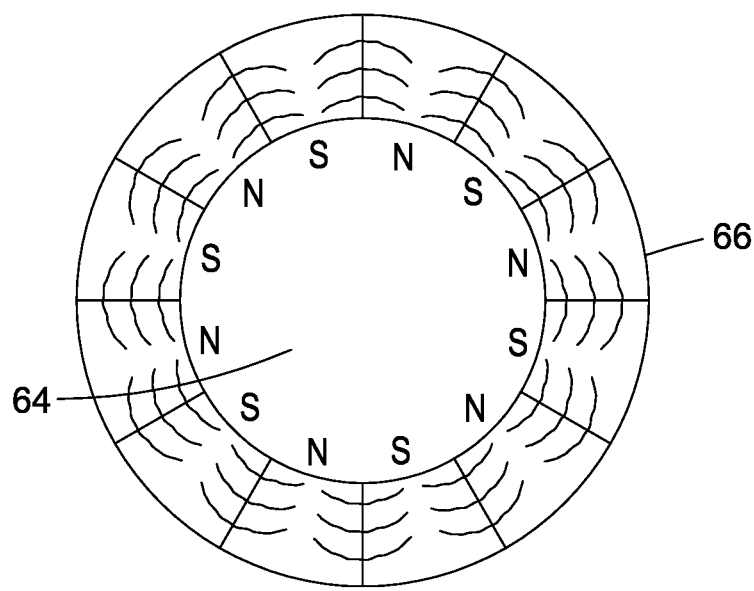
FIG. 6 is a cross-sectional side view of the magnetic flux lines formed in an inner annulus of a flywheel assembly, after magnetisation.

It has been recognised herein that it is advantageous for the magnetic flux lines created by the inner annulus 14 not to run parallel to the radii of the inner annulus 14, or to otherwise project out of the body of the inner annulus 14. Instead, it is beneficial for the magnetic flux lines to be contained within the body of the inner annulus 14 as much as possible. This containment of the magnetic flux helps to increase the magnetic strength of the inner annulus 14 once it has been magnetised. For example, the magnetic flux lines could run substantially concentric with the circular core 64 or circumference 66 of the inner annulus 14. As described above, once the inner annulus 14 has been magnetised, it will comprise a plurality of permanent N and S pole pairs. According to an embodiment, the magnetic flux lines are controlled to curve inwards towards each pole, arching over the rotational axis of the inner annulus 14, as illustrated in FIG. 6 herein.

As mentioned above, according to an embodiment, the winding of the tow 36 is controlled so that the density of the magnetic particles decreases towards the outer part of the inner annulus 14. This can be advantageous, as it enhances the ease with which the magnetic flux lines can be controlled and/or shaped and aims the majority of flux towards the stator 34 to enhance the current induced in the stator coils when generating.

Figure 7:
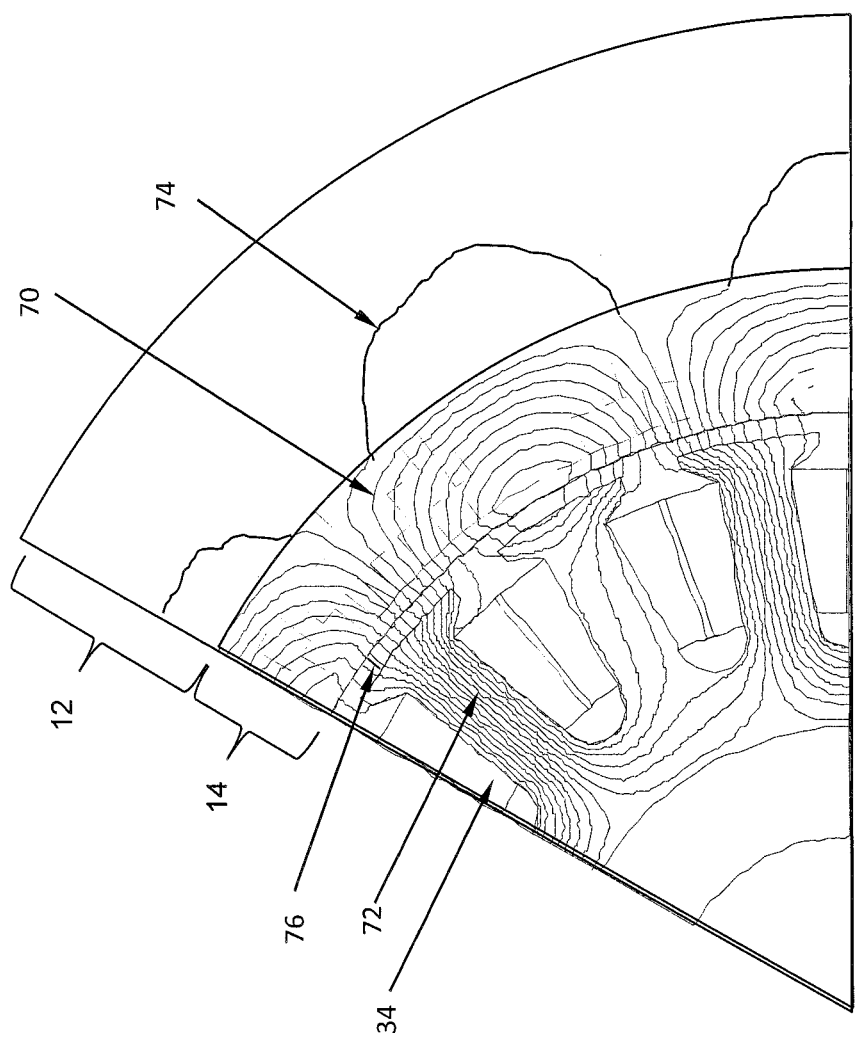
FIG. 7 shows assembled rotor and stator with corresponding magnetic flux lines and electric field lines.

FIG. 7 illustrates stator 34, inner annulus 14, outer rotor 12 and stator/rotor gap 76 when assembled. The magnetic fields 70 of the permanent magnet inner annulus 14 are shown as well as the electric field 72 of the stator 34. As is shown, the magnetic flux is concentrated towards the centre of the inner annulus and hence enables maximum transfer of energy between the rotor and the stator in either direction. There may be stray magnetic flux 74 imparted to the outer rotor 12, however, these are reduced by the density of the magnetic particles decreasing towards the outer part of the inner annulus 14 as previously described.

FIG. 8 shows an enlarged schematic cross-sectional view of the inner annulus 14, according to an embodiment, in a plane passing through its longitudinal axis. A relatively large wide winding angle between the tows of the inner annulus 14 and a normal to the longitudinal axis of the inner annulus 24 has been used when forming this inner annulus 14 from a length of tow 36, resulting in gaps between adjacent tow windings to accommodate magnetically loaded resin. Preferably the angle is less than 3.5° and more preferably less than 1.5°. More preferably still the angle is less than 1.25° and optionally more than 0.3°. More preferably still, the angle is less than 0.6° and greater than 0.3°, and even more preferably around 0.5°. This may be the case for all of the tow windings of the inner annulus. Preferably, the inner annulus is wound without including any fibres extending axially or more preferably without any fibres having a winding angle of more than 5°. By way of comparison, FIG. 9 shows a corresponding partial cross-section through the outer rotor 12 of a flywheel assembly 10, which does not need to accommodate magnetically loaded resin. It can be seen that, due to the narrow winding angle selected for the tows in FIG. 9, there are substantially no gaps between adjacent tow windings. However, the winding angle between the tows of the outer rotor 12 and a normal to the longitudinal axis of the rotor 24 is also large enough to ensure that there is no overlap between adjacent windings. The winding angle of the outer rotor 12 is preferably less than 2° and more preferably less than 1°. Preferably the angle is less than 0.6° and optionally more than 0.2°. More preferably the ending angle is less than 0.5° and more than 0.2°, and even more preferably around 0.315°. This may be the case for all of the tow windings of the outer rotor 12. In FIGS. 8 and 9, the cavities of FIG. 1 are not shown for clarity.

It has been recognised herein that the shape of the magnetic particles within the inner annulus 14 can impact upon the strength and reliability of the flywheel assembly 10 during operation. Using substantially spherical (or rounded) magnetic particles within the mixture 49 that is applied to the tow 36 to form the inner annulus 14 may be acceptable from a magnetic perspective. However, the use of spherical or rounded particles within a composite is generally not good for its physical strength—in particular its shear strength. In operation, the rotating parts of the flywheel assembly 10—including the inner annulus 14—will (at times) have to rotate at very high speeds. If the inner annulus 14 comprises spherical or rounded particles, those particles would not oppose longitudinal flow (expansion in the longitudinal direction substantially parallel to axis 24) during flywheel rotation, and so could contribute to—or at least not prevent—failure of, or damage to, the flywheel assembly 10. For example, such a failure could comprise annulus 14 shearing longitudinally and protruding from rather than being in alignment with outer rotor 12. Conversely, magnetic particles that are substantially planar—i.e. magnetic platelets or needle shapes—will hamper the longitudinal flow of the flywheel during high speed rotation. In addition platelets or needles prevent shearing of the layers of the inner annulus 14. According to an embodiment, therefore, the magnetic particles within the mixture 49 comprise platelets and needles. The platelets and needles can, according to an embodiment, be organised into a desired configuration by way of doctor blade 52 before the inner annulus 14 is cured. This is illustrated in FIG. 2A herein.

The use of substantially linear magnetic platelets can be advantageous with respect to the manner in which the flywheel assembly comes apart, if it experiences a failure. Due to the use of uni-directional fibre, the inner annulus is very strong in the plane perpendicular to the axis of rotation but relatively weak in the other direction in the plane parallel to the axis of rotation due to the absence of fibres extending in the axial direction and the relatively small winding angle. This is also the same for the outer rotor. As a result, during rotation, inner annulus 14 is constantly pushing outwardly into outer rotor 12. Inner annulus 14 and outer rotor 12 therefore deform in a barrel-type fashion. Essentially, the outer rotor and inner annulus are held together in the axial direction by matrix material only. The flywheel may therefore fail by splitting along a plane (or planes) perpendicular to the axis of rotation. The Outer rotor 12 may split first before any destructive deformation of inner annulus 14 occurs. Owing to the magnetic particle structure of inner annulus 14, even if destructive deformation were to occur, there are no large lumps of magnet contained within inner annulus 14 that may fly around the vacuum cavity if the rotor comes apart. This can be particularly important when the flywheel is housed in a relatively lightweight case—for example when housed in a high speed motor vehicle, for which reducing weight is very important—as such a lightweight case may not be strong enough to withstand the force of an uncontrolled explosion of the flywheel, in the event of a failure.

It has also been recognised herein that the size of the magnetic particles within the mixture 49 that is added to the tow 36 to form the inner annulus 14 can affect the fatigue performance of the flywheel assembly 10.

The skilled reader will be familiar with Griffith's Crack Theory, under which:

$$C = \sqrt{\frac{2E\gamma}{\pi}} \quad (1)$$

where E is the Young's modulus of the material and $\gamma$ is the surface energy density of the material, and wherein C is a constant. Also according to Griffith's Crack Theory, the constant, C, is linked to the critical flaw size (a) which will cause the material to crack when exposed to a particular amount of stress ($\sigma_f$) by the following relationship:

$$\sigma_f\sqrt{a} \approx C \quad (2)$$

Figure 10:
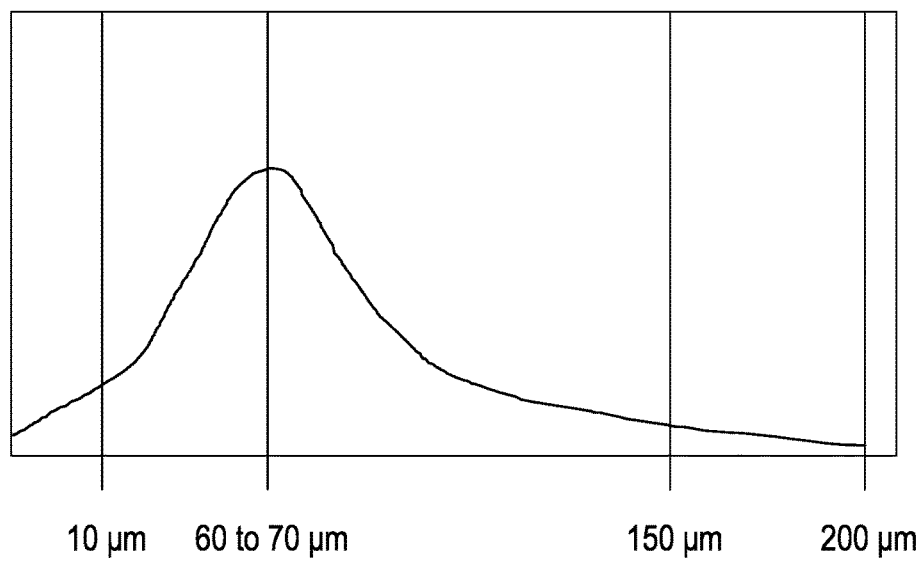
FIG. 10 shows a distribution curve of quench milled NdFeB (magnetic particle material)

It has been recognised herein that, if the magnetic particles within the inner annulus 14 were to be larger than the critical flaw size (a), they would in effect become 'flaws' in the inner annulus, and therefore would contribute to the failure risk of the flywheel assembly by reducing the fatigue life of inner annulus 14. Conversely, it has been recognised herein that, if the magnetic particles within the inner annulus 14 were to be smaller than the critical flaw size (a), and if they were preferably non-spherical, they would in effect be 'invisible' in relation to causing cracking under stress as determined by Griffith's Crack Theory. The magnetic particles do not affect the strength of the inner annulus 14 in the circumferential direction of the tow, however the strength in the direction perpendicular to the tow (longitudinal with respect to the flywheel assembly) is enhanced owing to the magnetic particles acting as structural reinforcing elements to the resin. According to an embodiment, therefore, the size of the magnetic particles comprised within the inner annulus 14 is less than the critical flaw size (a) for the tow material, wherein the critical flaw size (a) is calculated based on the amount of fatiguing i.e. the maximum amount of stress that the inner annulus 14 is to be exposed to during operation of the flywheel assembly 10. For example, the magnetic particles may each be less than 100 microns in length (longest dimension) with an average size of 60 microns and a maximum size of 500 microns. The material used may be quench milled NdFeB. FIG. 10 shows a distribution curve of quench milled NdFeB. The NdFeB may be milled to produce flat needle particles of dimension approximately 10 µm×20 µm×250 µm. Particles of less than 10 µm as the smallest dimension are rejected (for example by seiving) as such particles would increase the viscosity of the liquid polymer which is unfavourable. The particles tend to be of a needle shape when over 60 µm×60 µm×10 µm. Other material such as Samarium-cobalt magnet alloys (generally written as SmCo5, or SmCo may also be used for the magnetic particles and could be milled to form the desired shape and size distribution as shown in FIG. 10.

Figure 11:
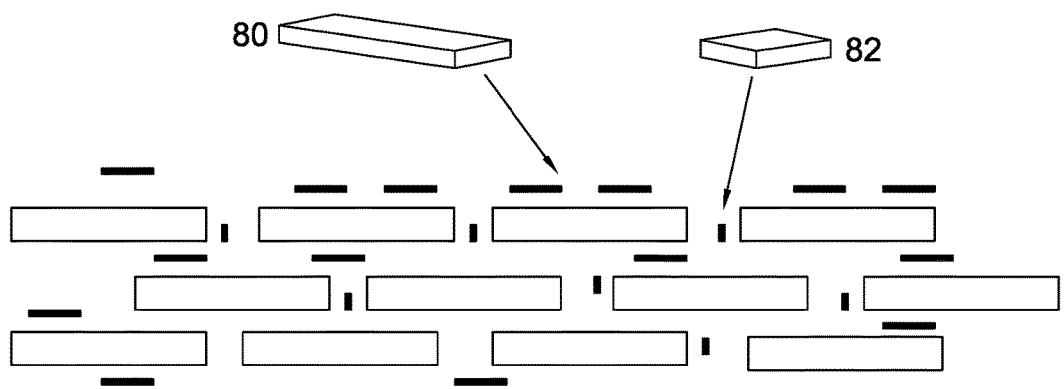
FIG. 11 shows magnetic particle positioning following winding of the tow and action of a doctor blade.

As shown in FIG. 11 and in conjunction with FIG. 8, longer needle shapes 80 tend to be mechanically urged to lay flat in the direction of winding on the surface of the individual tow layers 36 by the action of the doctor blade 52. Smaller particles 82 (typically of longest dimension (length) below the mean size of 60-70 µm of the distribution of FIG. 10) tend to be dragged into the gap between coincident (adjacent) tows by the action of winding the tow. This helps to align the magnetic flux lines of the inner annulus and hence the magnetic regimes up within the magnetic particles. It may be considered that each magnetic particle acts as an individual bar magnet that combine together to form the overall desired magnetic effect.

The improved method and system described herein enables the creation and operation of a flywheel assembly that is reliable, robust, efficient and safe. For example, it enables the magnetic flux profile of the magnetic, rotating part(s) of the flywheel to be shaped and controlled by providing an ideal shape in relation to stress and fatigue as well as for magnetic flux interaction. This helps to increase the amount of energy can be transferred to and from (and stored in) the flywheel assembly.

The magnetised inner annulus that is formed according to improved method and system described herein does not heat up during operation of the flywheel assembly. This is due to the absence of eddy currents. The absence of eddy currents, and the reduction in heating, means that the flywheel assembly can be cycled more often than other known flywheels. Known systems that comprise solid magnet rotors are limited to only a low number of cycles (motoring up to a maximum rotational speed and generating down to a minimum rotational speed) per hour owing to heating of the stator itself. This is because heating caused by operation, may only dissipate via radiation because the rotor must be positioned in a vacuum to reduce air resistance for high speed rotation. It also means that the control scheme employed for energising the stator coil(s) to move the rotor assembly can have a lower switching frequency and thereby be more efficient and require less processing power. This is described in more detail in another GB patent application being filed today in the name of Williams Hybrid Power Limited and so will not be discussed further herein. For example, a relatively simple synchronous square wave control scheme can be employed. Such a scheme reduces losses and heating in the inverter switching drive (or other control means) that is responsible for controlling the current pulses to the stator and which has to handle high currents (for example, of the order of 1000 amps), often at extremely high switching speeds.

The improved method and system described herein can be used to implement a flywheel assembly in a range of different applications, for example in high speed motor vehicles and/or in public vehicles including buses, trams, and other devices such as cranes, lifts and aircraft for example.

The flywheel assembly provides a kinetic energy storage device whereby energy can be recovered rather than being lost to the environment as would occur if no recovery system were provided. For example, rather than slowing down a vehicle by the use of friction brakes and dissipating excess energy as heat, the energy may be captured as the vehicle is slowing down.

As disclosed herein, the mechanical shape of the rotor of a flywheel device can be provided in a required manner substantially independent of the magnetic field shape. Accordingly, optimal mechanical properties as well as optimal magnetic flux properties can be provided by the same flywheel assembly without compromising either mechanical or magnetic flux properties.

The invention claimed is:

1. An annular rotor for a flywheel, the rotor comprising: a tow comprising a matrix of fibres wound about an axis and arranged in layers comprising a gap between adjacent tow windings, wherein a winding angle between a normal to the axis and the tow is less than 3.5° and the matrix further comprises magnetic particles of a size less than a critical flaw size of the tow, wherein the critical flaw size is calculated based on a maximum amount of stress that the annular rotor is to be exposed to during operation of the flywheel.

2. The annular rotor as claimed in claim 1 wherein the winding angle is less than 1.5°.

3. The annular rotor as claimed in claim 1 wherein the winding angle is less than 0.6°.

4. The annular rotor as claimed in claim 1 wherein the winding angle is greater than 0.3°.

5. The annular rotor as claimed in claim 1 wherein the magnetic particles are less than 500 µm in a longest dimension.

6. The annular rotor as claimed in claim 1 wherein the magnetic particles are more than 10 µm in a longest dimension.

7. The annular rotor as claimed in claim 1 wherein a density of the magnetic particles reduces with increasing distance from the axis.

8. The annular rotor as claimed in claim 1 wherein magnetic particles of longest dimension less than 70 µm are positioned in the gap between coincident tows.

9. The annular rotor as claimed in claim 1 comprising north-south pole pairs that are alternating north-south pole pairs, each pole of a pair occupying an arc around the annular rotor.

10. The annular rotor of claim 1 wherein pole pairs are arranged to direct a majority of magnetic flux towards the axis of the annular rotor.

11. A method of providing an annular rotor for a flywheel comprising:
    winding a tow comprising a matrix of fibres about an axis, the tow being arranged in layers comprising a gap between adjacent tow windings, wherein a winding angle between a normal to the axis and the tow is less than 3.5°; and
    providing magnetic particles within the matrix of a size less than a critical flaw size of the tow, wherein the critical flaw size is calculated based on a maximum amount of stress that the annular rotor is to be exposed to during operation of the flywheel.

12. The method of claim 11 wherein the winding angle is less than 1.5°.

13. The method of claim 11 wherein the winding angle is less than 0.6°.

14. The method of claim 11 wherein the winding angle is greater than 0.3°.

15. The method of claim 11 wherein the magnetic particles are less than 500 µm in a longest dimension.

16. The method of claim 11 wherein the magnetic particles are more than 10 µm in a longest dimension.

17. The method of claim 11 wherein a density of the magnetic particles reduces with increasing distance from the axis.

18. The method of claim 11 wherein particles of longest dimension less than 70 µm are urged to collect in the gap between coincident tows when winding the annular rotor.

19. The method as claimed in claim 18 wherein the rotor comprises alternating north-south pole pairs, each pole of a pair occupying an arc around the annular rotor.

20. The method of claim 19 wherein the pole pairs are arranged to direct a majority of magnetic flux towards the axis of the annular rotor.

* * * * *